United States Patent [19]

Toosky

[11] Patent Number: 4,732,518

[45] Date of Patent: Mar. 22, 1988

[54] FATIGUE-RESISTANT FLARED FASTENER

[75] Inventor: Rahmatollah F. Toosky, Irvine, Calif.

[73] Assignee: Deutsch Fastener Corp., Lakewood, Calif.

[21] Appl. No.: 942,536

[22] Filed: Dec. 16, 1986

[51] Int. Cl.$^4$ ............................................. F16B 37/04
[52] U.S. Cl. .................................. 411/181; 411/108; 411/177
[58] Field of Search ............... 411/181, 180, 173, 177, 411/105, 108, 109, 999

[56] References Cited

U.S. PATENT DOCUMENTS

| Re. 27,143 | 6/1971 | Breed et al. | 151/41.73 |
|---|---|---|---|
| 1,686,468 | 10/1928 | Rosenberg . | |
| 1,966,835 | 7/1934 | Stites | 85/1 |
| 2,490,594 | 12/1949 | Madden | 85/32 |
| 3,079,970 | 3/1963 | Barry | 151/41.73 |
| 3,125,146 | 3/1964 | Rosan | 411/181 X |
| 3,177,916 | 4/1965 | Rosan | 411/103 |
| 3,294,140 | 12/1966 | Cosenza | 411/105 |
| 3,461,936 | 8/1969 | Rosan et al. | 411/180 |
| 3,695,324 | 10/1972 | Gulistan | 151/41.74 |
| 3,765,078 | 10/1973 | Gulistan | 29/432 |
| 4,012,884 | 3/1977 | Pagel | 403/408 |
| 4,097,168 | 6/1978 | Pagel | 403/388 |
| 4,186,787 | 2/1980 | Husain | 151/41.73 |
| 4,557,650 | 12/1985 | Molina | 411/108 |

FOREIGN PATENT DOCUMENTS

| 2113808 | 8/1979 | Fed. Rep. of Germany | 411/180 |
|---|---|---|---|
| 670048 | 10/1964 | Italy | 411/173 |

Primary Examiner—Robert L. Wolfe
Assistant Examiner—Suzanne L. Dino
Attorney, Agent, or Firm—Gausewitz, Carr & Rothenberg

[57] ABSTRACT

The fastener includes a nut, a basket, and a sleeve, the latter being received in an opening in a workpiece with its outer end flared to form an attaching flange. Spaced rounded lobes on the sleeve extend the full length of the opening and become embedded in the wall of the opening. The sleeve includes a corner surface adjacent its head which compresses and deforms the workpiece at one corner of the opening. A tool having an annular bulge is forced into the sleeve to expand it against the wall of the opening. When the end of the sleeve is flared to form the attacking flange, the other corner of the opening in the workpiece is compressed and cold-worked. The forces exerted by the sleeve on the workpiece greatly increase the fatigue life of the workpiece.

21 Claims, 11 Drawing Figures

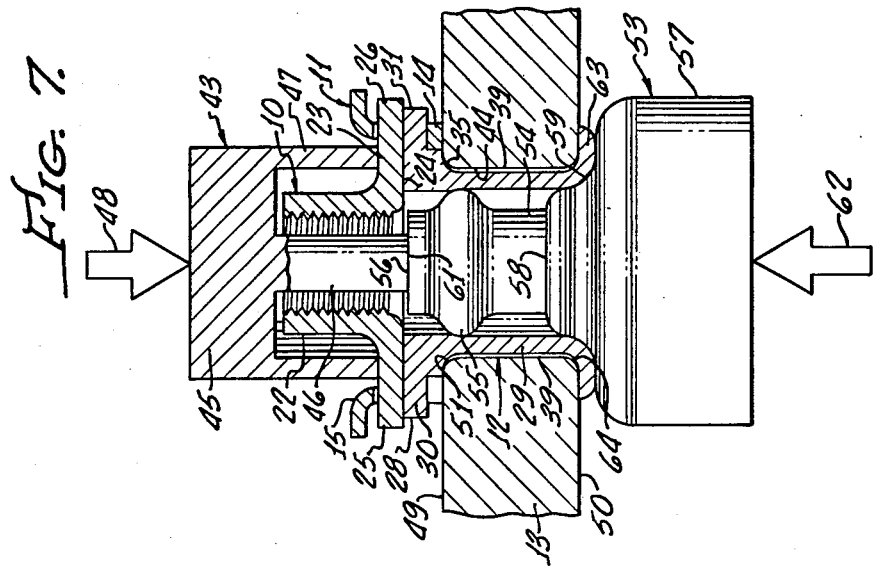
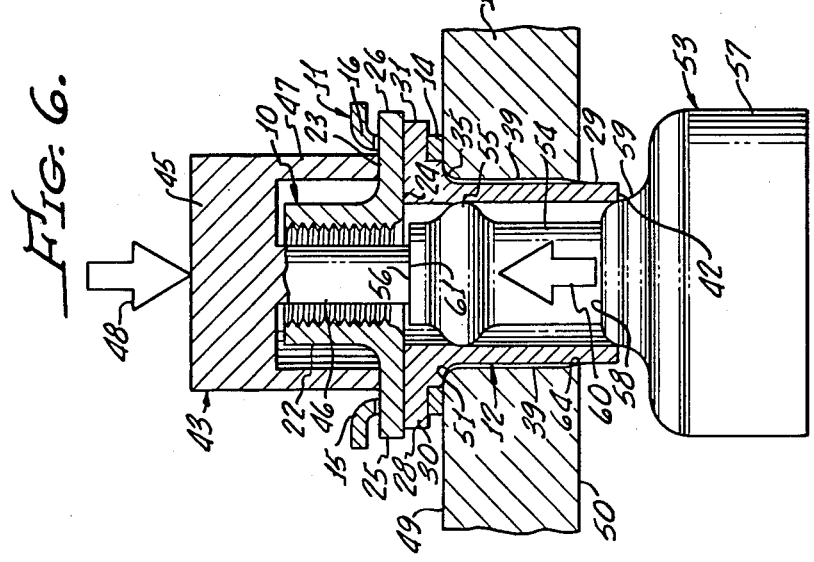
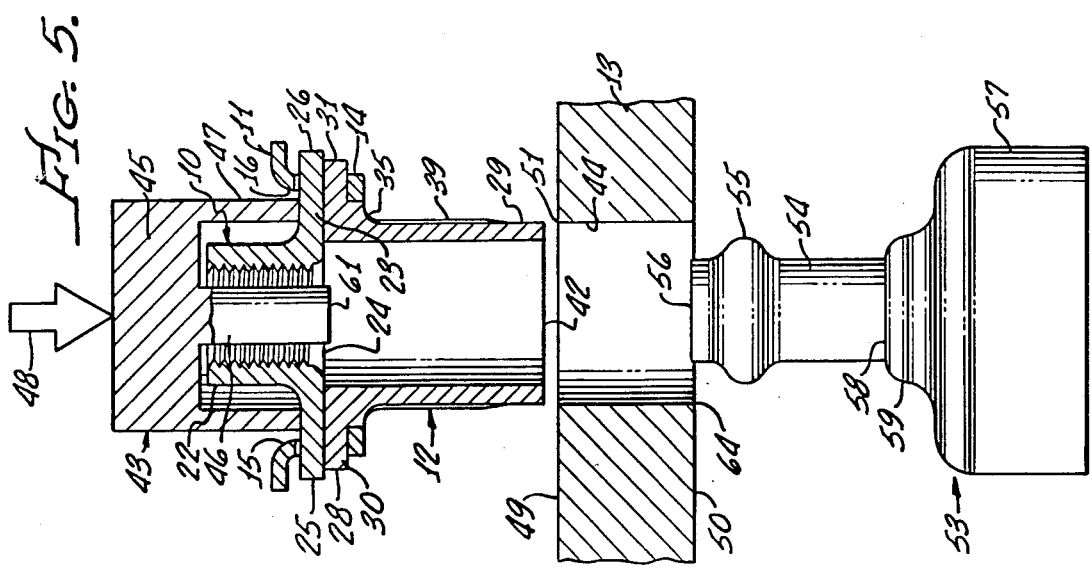

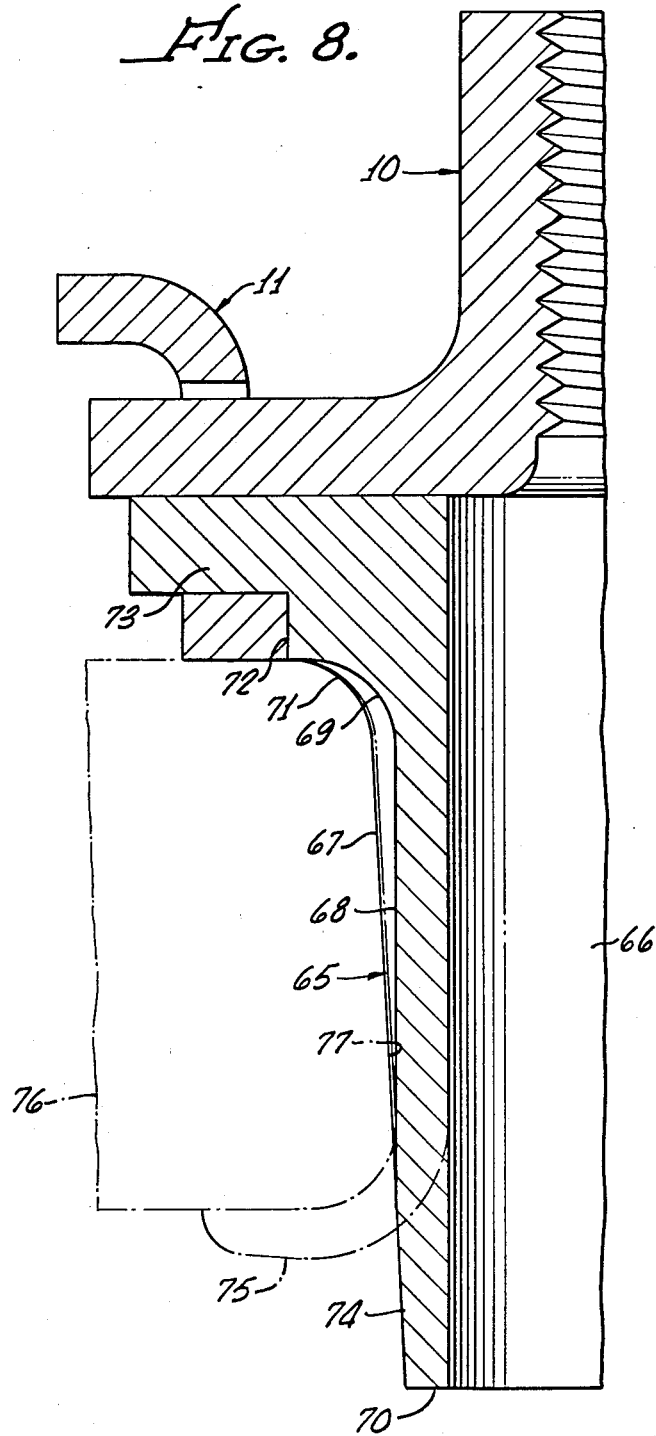
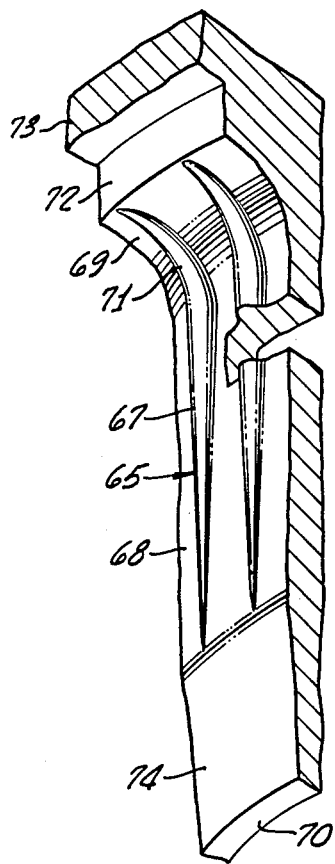
Fig. 8.
Fig. 9.

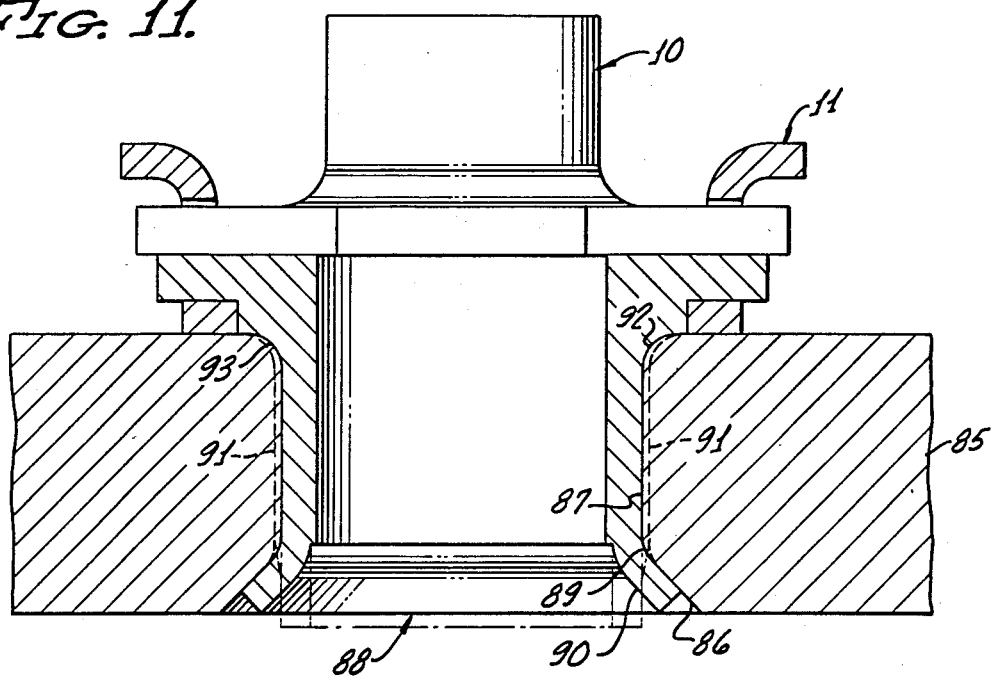
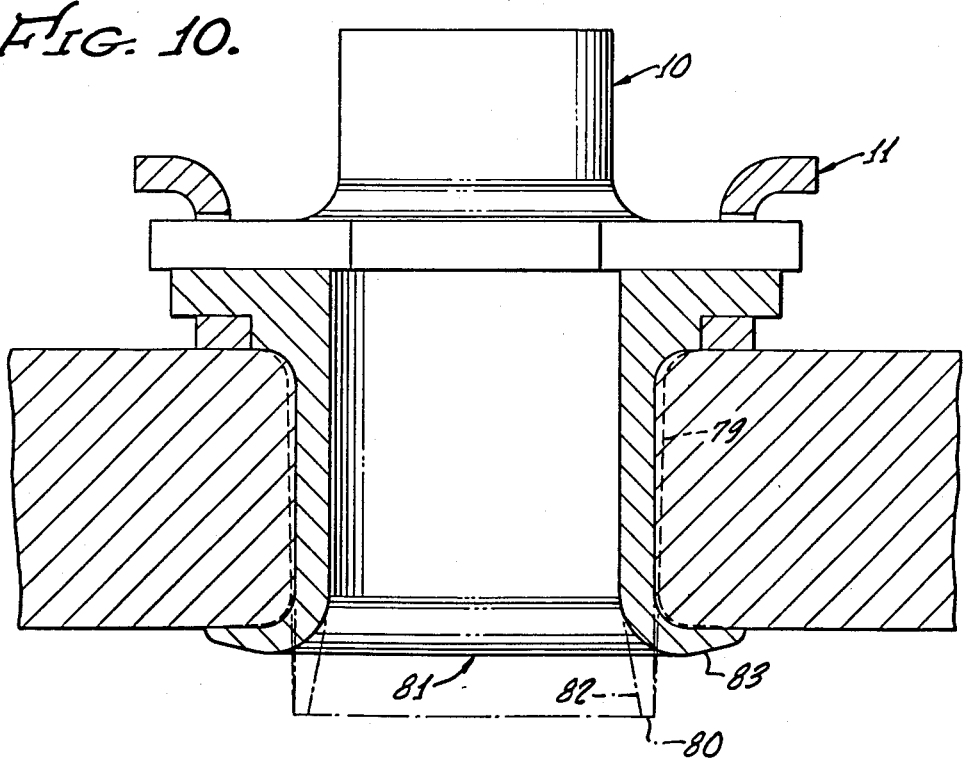

FATIGUE-RESISTANT FLARED FASTENER

BACKGROUND OF THE INVENTION

A successful rivetless nut plate fastener, used in the aerospace industry, is made up of three components: a nut, a basket and a sleeve. This fastener is disclosed in U.S. Pat. No. 3,695,324. The basket has opposed side walls with slots in them and a bottom wall connecting the side walls. The nut is received between the side walls of the basket and has tabs extending through the openings in the side walls, permitting limited floating movement of the nut, but preventing substantial rotation. The sleeve has a head portion, including tabs overlying the undersurface of the basket beneath the nut and extending into the slots, and a tubular portion projecting through the opening in the undersurface for entry into an aperture in a workpiece. Upon installation, the outer end of the sleeve is flared outwardly to form a flange, connecting the fastener assembly to the workpiece. A portion of the tubular part of the sleeve near the head is provided with a short straight knurl to become embedded in the wall of the workpiece at the opening to preclude rotation of the assembly relative to the workpiece.

This type of fastener generally has been limited to non-structural applications, because of concern that the knurl may create stress risers in the workpiece where it penetrates and becomes embedded in the workpiece. The result would adversely affect the fatigue life of the workpiece.

An effort was made to improve the fatigue life of the workpiece through redesign of the knurl on the sleeve as lobes of a special configuration. This modification is illustrated in U.S. Pat. No. 4,557,650. Nevertheless, the fatigue life of the workpiece was not enhanced by the presence of the fastener in the opening formed in the workpiece to receive it.

SUMMARY OF THE INVENTION

The present invention provides a rivetless nut plate fastener that results in vastly improved fatigue life of the workpiece. Tests have indicated that fatigue life is around twenty times greater with the design of this invention than it is with prior designs.

As before, the fastener includes a nut, a basket and a sleeve having a tubular part extending from a head that overlies the undersurface of the basket. Modifications in the sleeve and the manner of its installation result in cold-working and compression of the workpiece to effect greatly improved fatigue life.

The lobes are made rounded, but their roots are omitted so as to leave the cylindrical surface of the tubular portion exposed between the lobes. This means that when the lobes are forced into the wall of the opening in the workpiece there are no voids around the circumference of the fastener, as occurred with previous designs. In certain prior fastener constructions, with recessed roots between the crests of the lobes, the material of the workpiece would not entirely fill the root areas between the lobes, resulting in gaps in these locations. The lobes are made longer than in the earlier rivetless nut plate fastener, now extending the full length of the opening in the workpiece. This improves fatigue life by enabling the lobes to compress the material of the workpiece the full length of the opening.

In addition, the sleeve is provided with a section at the head which is of relatively large exterior diameter and complementarily fits within the opening in the basket. A smaller diameter tubular part extends beyond the relatively large first part of the tubular portion of the sleeve. These two parts are interconnected by a third portion forming a rounded concave exterior corner between them. The lobes may extend into this corner portion, tapering in dimension as they approach the section of larger diameter. When the fastener is forced into the opening in the workpiece, the corner portion of the sleeve is caused to bear against the corner of the opening in the workpiece. This swages this portion of the workpiece, cold-working it and placing it under compression. This contributes to a significantly improved fatigue life.

After the sleeve has been pressed into the opening, it is expanded to assure that its entire periphery bears firmly against the wall of the opening. This is another factor in the enhanced fatigue life of the workpiece. A tool having an annular bulge is forced into the end of the sleeve to accomplish this, progressively expanding the sleeve as it moves through it.

The outer end of the tubular portion of the sleeve then is flared outwardly to form a flange that connects the fastener to the workpiece. In some instances, the lobes may extend into this outer portion of the sleeve, again tapering in dimension as the end of the sleeve is reached. When the end of the tubular portion of the sleeve is bent outwardly to form the flange, a force is applied to the inside of the sleeve to press it outwardly against the wall of the workpiece at the corner of the opening in the workpiece. Again, the material of the workpiece is cold-worked and placed under compression, and fatigue life is increased.

Thus, the fastener of this invention is readily producible, yet results in vastly improved performance as compared with earlier designs.

BRIEF DESCRIPTION OF THE DRAWINGS

FIGS. 5, 6 and 7 are longitudinal sectional views illustrating the sequence of attachment of the fastener to a workpiece;

FIG. 8 is a fragmentary longitudinal sectional view of a modification of the fastener;

FIG. 9 is a fragmentary perspective view of the fastener sleeve;

FIG. 10 is a longitudinal sectional view of a different embodiment of the fastener as attached to a panel; and FIG. 11 is a longitudinal sectional view of another embodiment of the fastener.

DETAILED DESCRIPTION OF THE INVENTION

Figure 1:
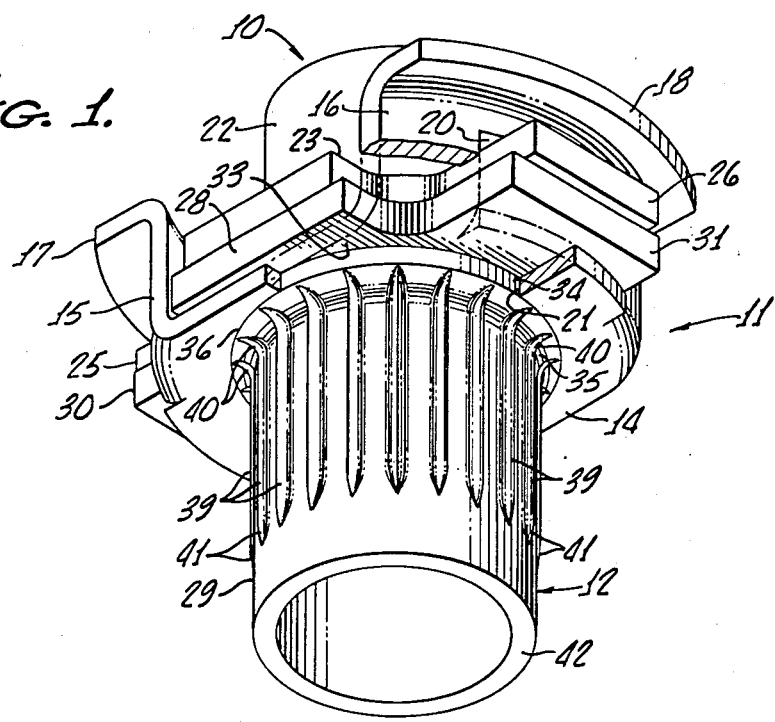
FIG. 1 is a perspective view of the fastener of this invention.
Figure 2:
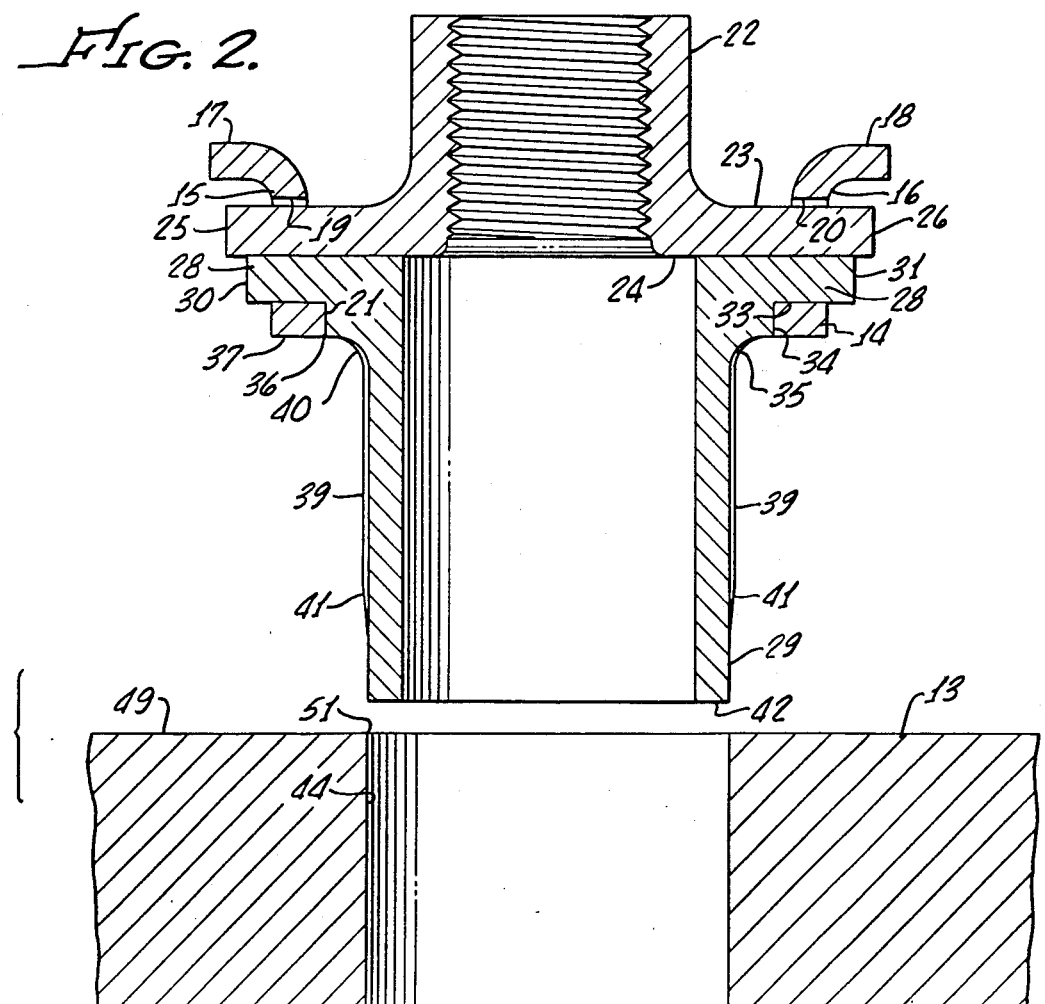
FIG. 2 is a longitudinal sectional view of the fastener and a panel to which it is to be attached.

The fastener of this invention includes a nut 10, a basket 11 and a sleeve 12 for attaching the assembly to a workpiece, such as a panel 13. The basket 11 is generally U-shaped in side elevation, including a bottom wall 14 and opposed upstanding side walls 15 and 16. Outwardly projecting flanges 17 and 18 are at the upper ends of the side walls 15 and 16. Slots 19 and 20 extend through the side walls 15 and 16, adjacent the bottom wall 14, and a relatively large circular opening 21 is formed at the center of the bottom wall 14. The basket 11 preferably is made of resilient material so that the side walls 15 and 16 can be deflected to permit the nut 10 to be removed and be replaced.

The nut 10 includes a threaded barred 22 and a flat base flange 23 at one end 24 of the barrel which defines tabs 25 and 26 that extend radially outwardly in opposite directions. The tabs 25 and 26 fit within the slots 19 and 20 in the side walls 15 and 16 of the basket 11. This retains the nut 10 against substantial movement relative to the basket 11. However, the barrel 23 is spaced inwardly from the side walls 15 and 16, and there is a clearance around the tabs 25 and 26 at the slots 19 and 20 which allows the nut limited floating movement relative to the basket 11.

Figure 3:
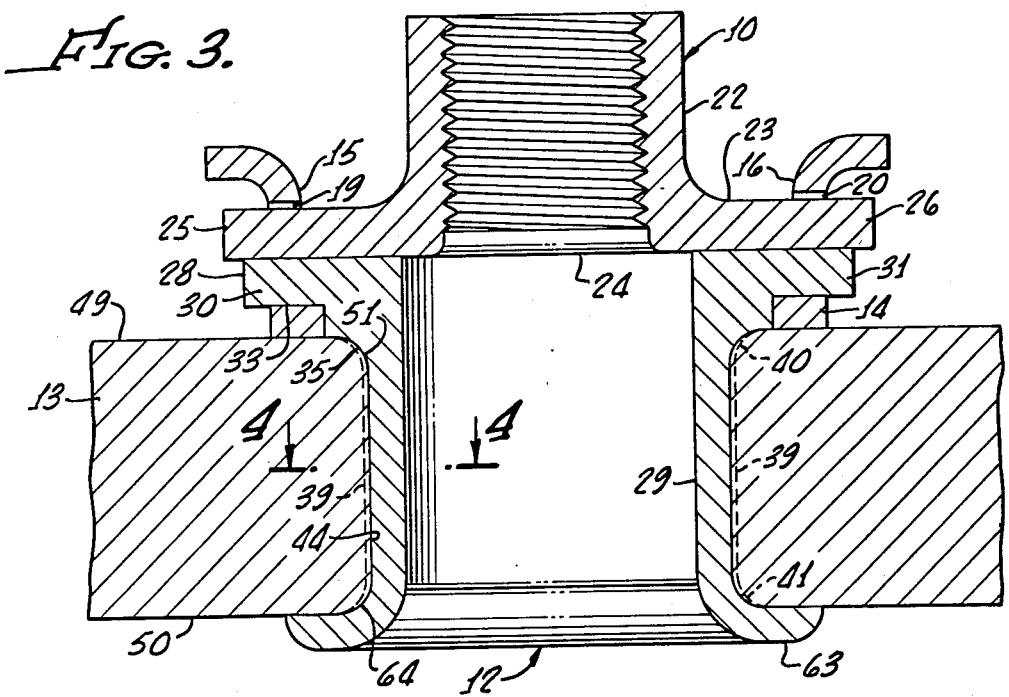
FIG. 3 is a longitudinal sectional view of the fastener as attached to a panel.
Figure 4:
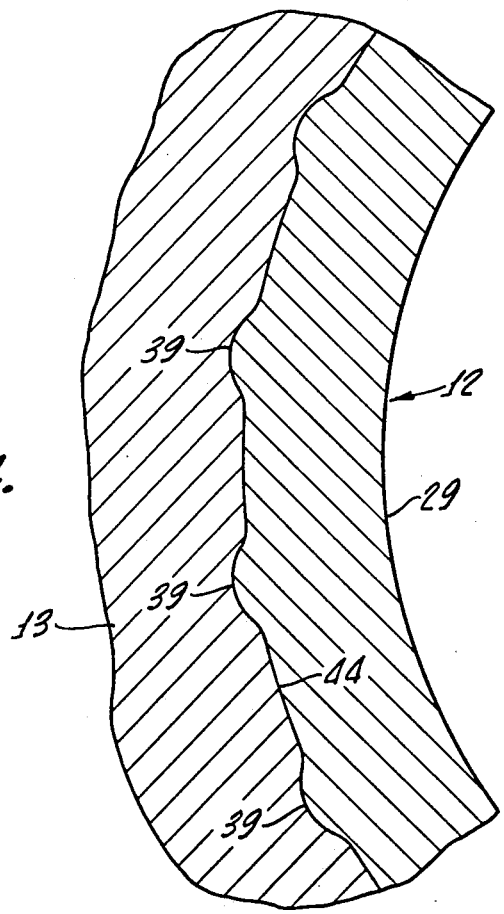
FIG. 4 is an enlarged fragmentary transverse sectional view taken along line 4—4 of FIG. 3.

The sleeve 12 includes a head 28 and a tubular portion 29 that is perpendicular to the head. A portion of the head 28 includes diametrically oppositely projecting tabs 30 and 31 which overlie the bottom wall 14 of the basket 11 and extend through the slots 19 and 20 in the side walls 15 and 16 of the basket. The base flange 23 of the nut 10 overlies the head 28, as seen in FIG. 3, and the tabs 25 and 26 of the nut are located above the tabs 30 and 31 of the sleeve.

The undersurface of the head 28 of the sleeve 12, that is, the surface remote from the nut 10, is of stepped configuration, including a radial flat surface 33 that bears against the bottom wall 14 of the basket 11. From the surface 33 projects a short cylindrical surface 34 which is coaxial with the tubular portion 29 of the sleeve 12. The surface 34 is continuous around the circumference of the sleeve. The length of the surface 34 is the same as that of the thickness of the bottom wall 14 of the basket 12. The surface 34 is dimensioned so that that portion of the sleeve 12 fits complementarily within the opening 21 in the basket wall 14. A rounded concave surface 35 connects the outer end of the cylindrical surface 34 of the sleeve with the tubular portion 29. The surface 35 extends axially of the sleeve beyond the surface 34 to smoothly fair into the outer surface of the tubular portion 29. The corner 36 between the surfaces 34 and 35 is flush with the undersurface of the bottom basket wall 14.

Projecting outwardly from the tubular portion 29 of the sleeve 12 are axially extending lobes 39 which are rounded convexly. The roots of the lobes are omitted so that the crests of the lobes are spaced apart circumferentially of the tubular portion 29 and there are segments of the cylindrical outer surface of the tubular portion 29 intermediate the adjacent lobes. At their upper ends 40, that is, at the ends adjacent the head 28 of the sleeve 12, the lobes 39 extend along the concave surface 35, tapering in dimension so as to terminate close to the corner 36. The opposite ends 41 of the lobes 39 also taper, terminating at a location spaced inwardly of the outer end 42 of the sleeve 12.

The tool for connecting the fastener to the panel 13, shown in FIGS. 5, 6 and 7, may include a member 43 used in forcing the tubular portion 29 of the sleeve 12 into the cylindrical opening 44 in the panel. The member 43 has a head 45 at one end, with a post 46 projecting perpendicularly from its center and a tubular part 47 extending in the same direction from the periphery of the head. The outer end of the tubular part 47 is brought to bear against the base flange 23 of the nut 10, with the post 46 then extending through the nut to the head end of the sleeve 12. A force is applied to the member 43, as indicated by the arrow 48, pushing on the base flange 23 of the nut 10, which transmits the force to the head 28 of the sleeve. This drives the tubular part 29 of the sleeve into the opening 44 so as to bring the bottom wall 14 of the basket into engagement with the flat upper surface 49 of the panel 13. The sleeve 12 is longer than the opening 43 so that the outer end 42 of the sleeve then projects beyond the undersurface 50 of the panel.

The tubular portion 29 is dimensioned so that its cylindrical outer surface is substantially complementary to the wall of the opening 44. Therefore, as the sleeve is pressed into the opening 44, the lobes 39, which project beyond the surface of the tubular portion 29, dig into the wall of the opening, forming an interference fit and precluding rotation of the sleeve relative to the panel 13. Entry of the sleeve into the opening 44 is facilitated by the tapered ends 41 of the lobes 39.

By reason of the fact that the lobes 39 are spaced apart circumferentially, without recessed root portions between them, the surface of the sleeve between the lobes is positioned next to the wall of the opening without significant voids between the sleeve and the wall of the opening. In prior designs, with deeper roots between the lobes, there were gaps between the sleeve and the wall of the opening at the root areas. The lobes 39 exert a compressive force on the panel 13 as they displace the material of the panel radially outwardly and laterally relative to the lobes. The lobes 39 are dimensioned so that they extend the full length of the opening 44, compressing the panel in this manner along the entire opening.

The axial force that is applied to the fastener to drive the tubular portion 29 of the sleeve 12 into the opening 44 of the panel 13 also causes the sleeve connecting surface 35 and the tapered inner ends 40 of the lobes 39 to react against the panel 13 at the corner 51 between the upper flat surface 48 of the panel and the opening 44. This reaction compresses the panel 13 at the corner 51, cold-working it so that it assumes a convexly rounded configuration corresponding to the curvature of the surface 35, as shown in FIG. 3. Thus, additional compression of the workpiece is provided for enhancing the fatigue life of the panel.

The installation tool also includes an assembly 53 for expanding the sleeve and flaring its outer end 42. The assembly 53 is actuated after the sleeve has been forced into the opening 44 by the member 43. This assembly includes a central rod 54 having a convexly rounded annular enlargement 55 near its outer end 56. The diameter of the enlargement 55 is slightly greater than the inside diameter of the sleeve 12. The rod 54 is movable axially through an opening in a body 57. The latter member has a narrow end 58, through which the rod extends, and a rounded concave annular die surface 59 that flares outwardly from the end 58.

In use, the assembly 53 is moved so as to advance the rod 54 axially and cause it to enter the tubular portion 29 of the sleeve 12 at its outer end 42. The member 43 continues to apply a force in the opposite direction during this time. The rod movement, indicated by the arrow 60 in FIG. 6, is continued until the end 56 of the rod engages the end 61 of the post 46. These interengaging surfaces form abutments that terminate the axial movement of the rod 54. The enlargement 55 of the rod then is located close to the corner surface 51 of the sleeve. In moving through virtually the entire length of the tubular portion 29 of the sleeve to that position, the enlargement 55 progressively expands the sleeve, causing its entire periphery to bear tightly against the wall of the opening 44 in the panel 13. The outward pressure exerted by the expanded sleeve adds to the fatigue resistance of the workpiece.

After the rod 54 has been moved axially, the body 57 is moved relative to the rod 54 and the sleeve 12 in the same direction, as indicated in FIG. 7 by the arrow 62. This causes the die surface 59 to engage the outer end 42 of the tubular portion 29 of the sleeve 12, flaring it outwardly to form a flange 63 that retains the fastener assembly to the panel 13. The body 57 is urged against the end 42 of the tubular portion 29 with a force sufficient not only to deflect the end portion, but also to deform the corner 64 of the panel 13 at the outer end of the opening 44. The die surface 59 is contoured so that it will compress the panel at the corner 64 and give it a rounded convex shape, as shown in FIGS. 3 and 7. This further enhances the fatigue resistance of the workpiece. The flange 63 also is urged tightly against the surface 50 of the panel.

The tool then is removed, leaving the fastener attached to the panel 13. After the enlargement 55 has left the sleeve 12, there is a tendency for the material of the sleeve to spring back a slight amount. However, the engagement of the flange 63 with the surface 50 of the panel 13 prevents this. As a result, stress within the sleeve attempts to foreshorten the sleeve, which cannot occur because of the engagement with the panel 13 at the ends of the opening 44. This increases the force of the flange 63 against the surface 50 of the panel 13, adding to the beneficial compression of the workpiece.

The resulting attached fastener assembly provides dramatically improves fatigue life of the workpiece, arising from the cold-working of the workpiece and the compressive forces applied to it. Fatigue life is far greater not only than that of earlier floating flare nut designs, as shown in U.S. Pat. Nos. 3,695,324 and 4,557,650, but also much greater than that of the panel with a riveted nut plate attached to it.

In the embodiment of FIGS. 8 and 9, the lobes 65 on the sleeve 66 taper in thickness and height. The principal portion 67 of the lobes 65 tapers along the cylindrical exterior surface 68 of the sleeve 66 from the rounded inner corner 69 to a location spaced from the end 70 of the sleeve. A shorter portion 71 of the lobe tapers around the curved corner 69 to the juncture with a short cylindrical surface 72 at the head 73 of the sleeve.

The exterior surface 74 of the sleeve beyond the lobes 65 is tapered at the same angle as the taper of the lobes. This provides the outer end portion of the sleeve with a decreased wall thickness to facilitate the flaring operation to produce the flange 75 used in retaining the sleeve to the workpiece 76. The taper of the lobes 65 facilitates their entry into the opening 77 in the workpiece 76 as the fastener is installed.

In the embodiment of FIG. 10, the lobes 79 also are tapered toward the outer end 80 of the sleeve 81, and, in this instance, extend all the way to the outer end 80. The interior surface 82 of the outer end portion of the sleeve 81 is tapered, reducing the wall thickness of the sleeve to help in the bending of the flange 83 over the panel 84. The presence of lobes on the end portion of the sleeve increases the compression of the workpiece at the outer edge of the corner of the opening in the workpiece, as well as around the opening, which is desirable in enhancing fatigue resistance. However, the lobes 79 also make it more difficult to bend the outer portion of the sleeve in forming the flange, so that an increased force will be necessary in bending the flange tightly against the surface of the workpiece.

The FIG. 11 embodiment illustrates the fastener as applied to a workpiece 85 provided with a countersink 86 at the outer end of the opening 87 for the sleeve 88. The outer end portion of the sleeve 88 is bent outwardly to bear against the surface of the countersink 86, and, in performing this operation, sufficient force is applied to compress the material of the workpiece along the countersink 86 and around the corner 89 where the cylindrical opening 87 meets the countersink 86. A counterbore 90 at the outer end of the sleeve 88 results in reduced wall thickness to facilitate bending to form the flange. Lobes 91 on the sleeve 88 penetrate the wall of the opening 87 as the sleeve is installed to provide torque-out resistance and to produce compression and cold-working of the workpiece. Again, the inner corner 92 of the workpiece at the end of the opening 87 is compressed by the rounded corner 93 of the fastener adjacent its head.

The foregoing detailed description is to be clearly understood as given by way of illustration and example only, the spirit and scope of this invention being limited solely by the appended claims.

What is claimed is:

1. The method of attaching a fastener to a workpiece so that said fastener will not rotate relative to the workpiece and the workpiece will have enhanced fatigue resistance comprising the steps of providing a fastener element adapted to mesh with a mating fastener element, providing a connection between said fastener element and a sleeve, providing said sleeve with a head at one end thereof, a tubular part spaced from said head, and a connecting part having an exterior surface projecting axially from said head and inclined radially inwardly to said tubular part, forming lobes on said tubular part extending axially thereof, providing a workpiece with a cylindrical opening shorter than the length of said tubular part with a diameter less than the diameter of said tubular part at the crests of said lobes and having a corner at either end, forcing said tubular part into said opening so that said lobes become embedded in the wall of said opening, thereby compressing and cold-working the same, so that said exterior surface of said connecting part reacts against one of said corners of said workpiece so as to deflect said one corner radially outwardly and axially inwardly of said opening thereby to compress and cold-work said workpiece at said one corner, and so that the outer end of said tubular part projects beyond the other of said corners, expanding said tubular part after said tubular part has been so forced into said opening so that at least a substantial portion of the exterior surface thereof is forced against the wall of said opening and compresses said workpiece along said opening, bending said outer end of said tubular part outwardly to form a flange overlapping said workpiece for axially retaining said sleeve to said workpiece, and forcing said tubular part in the vicinity of the base of said flange against the other of said corners of said workpiece so as to deflect said other corner radially outwardly and axially inwardly of said opening thereby to compress and cold-work said workpiece at said other corner.

2. The method as recited in claim 1 in which said lobes are made to extend at least the full length of said opening in said workpiece when said sleeve is so forced into said opening in said workpiece.

3. The method as recited in claim 1 in which said lobes are tapered toward said outer end of said sleeve.

4. The method as recited in claim 1 in which said tubular part of said sleeve is so expanded so that the exterior surface thereof is so forced against the wall of said opening for substantially the full length of said opening.

5. The method as recited in claim 1 in which in so bending said outer end of said tubular part outwardly and so compressing and cold-working said other corner a member is provided with a die surface thereon, said die surface of said member being forced against said outer end of said tubular part for first bending said outer end of said tubular part outwardly to form a flange and then engaging the interior of said sleeve in the vicinity of the base of the flange.

6. The method as recited in claim 1 in which said exterior surface of said connecting part is provided with a rounded concave curvature and provides said one corner with a rounded convex curvature when said connecting part is so forced against said one corner.

7. The method as recited in claim 6 in which said lobes are extended into said connecting part and the portions of the lobes so extended become embedded into said one corner of said workpiece.

8. The method as recited in claim 1 in which said tubular part is so expanded progressively from said outer end thereof to a location inwardly of said outer end thereof.

9. The method as recited in claim 1 in which for so expanding said tubular part a tool having a larger diameter than the inside diameter of said tubular part is forced into said tubular part from said outer end thereof.

10. The method as recited in claim 9 in which said tool is formed so as to have a localized annular bulge which is moved axially of said tubular part and progressively expands the same.

11. The method as recited in claim 9 in which an abutment member is inserted into said sleeve at said one end thereof, and said tool is provided with an abutment thereon and forced into said tubular part to a position where said abutment on said tool engages said abutment member.

12. The method as recited in claim 1 in which in so providing said connection between said fastener element and said sleeve a member is formed having opposite side walls having slots therein and an interconnecting wall having an opening therethrough, said fastener element is provided with outwardly projecting tabs extending into said slots,
said sleeve is provided with outwardly projecting tabs extending into said slots, and
said head of said sleeve is provided with a relatively short portion extending to said connecting part,
said relatively short portion being made substantially the length of and being positioned within said opening in said interconnecting wall.

13. The method as recited in claim 12 in which said opening in said interconnecting wall is made circular, and said relatively short portion is made cylindrical and to a dimension so that it is substantially complementarily so received in said opening in said intermediate wall.

14. In combination with a workpiece having parallel principal surfaces and a cylindrical opening interconnecting said surfaces, the wall of said opening intersecting one of said surfaces and being perpendicular to said one surface at said intersection so as to define a corner therebetween, a fastener for imparting fatigue resistance to said workpiece comprising a nut,
a basket retaining said nut,
said basket having opposed side walls and a bottom wall interconnecting said side walls and having an opening therethrough, said bottom wall being adapted to overlie said one surface with said opening through said bottom wall aligned with said opening in said workpiece, and
a sleeve having a head overlying said bottom wall of said basket and a tubular portion extending from said head,
said tubular portion having
a first part of a first relatively large exterior diameter extending through said opening in said bottom wall of said basket and terminating substantially at the undersurface of said bottom wall,
a second part of a second relatively small exterior diameter spaced longitudinally of said sleeve from said first part and adapted to enter said opening in said workpiece with the outer end of said sleeve projecting beyond the other of said principal surfaces of said workpiece,
said outer end of said sleeve being bendable outwardly for forming a flange for retaining said fastener to said workpiece,
and a third part projecting from said first part and inclined inwardly toward the longitudinal axis of said sleeve and toward the outer end thereof so as to interconnect said first and second parts for engagement with said corner of said workpiece for deflecting said corner radially outwardly and axially inwardly of said opening in said workpiece, thereby compressing and cold-working the material of said workpiece at said corner so as to increase the fatigue life of said workpiece,
said second part of said sleeve having a plurality of rounded lobes thereon extending longitudinally thereof from at least the juncture of said second and third parts to at least said bendable outer end of said second part for engaging and compressing the material of a workpiece when said second part is received in an opening therein for increasing the fatigue life of said workpiece and preventing rotation of said sleeve relative to said workpiece, the exterior lateral dimension of said second part across the crests of said lobes being less than said first diameter.

15. In combination with a workpiece having an opening therethrough, a first surface at one end of said opening, a second surface at the opposite end of said opening, a first corner at the intersection of the wall of said opening and said first surface, and a second corner at the intersection of the wall of said opening and said second surface, a fastener for imparting fatigue resistance to said workpiece comprising a nut,
a basket retaining said nut,
   said basket having opposed side walls and a bottom wall interconnecting said side walls and having an opening therethrough, said bottom wall overlying said first surface with said opening through said bottom wall being aligned with said opening in said workpiece, and
a sleeve having a head overlying said bottom wall of said basket and a tubular portion extending from said head,
   said tubular portion having
      a first part of a first relatively large exterior diameter extending through said opening in said bottom wall of said basket and terminating substantially at the undersurface of said bottom wall,
      a second part of a second relatively small exterior diameter spaced longitudinally of said sleeve from said first part and received in said opening in said workpiece with the outer end of said sleeve extending beyond said opening and being bent outwardly to form a flange overlying said second surface for retaining said fastener to said workpiece, said sleeve at the base of said flange being deflected outwardly against said second corner and deflecting and compressing said workpiece radially outwardly and axially inwardly of said opening at said second corner, and
      a third part projecting from said first part and inclined inwardly toward the longitudinal axis of said sleeve and toward the outer end thereof so as to interconnect said first and second parts, said third part engaging said first corner and deflecting and compressing said workpiece radially outwardly and axially inwardly of said opening at said first corner,
      said second part having a plurality of rounded lobes thereon extending longitudinally thereof and embedded in the wall of said opening for preventing rotation of said sleeve relative to said workpiece, the exterior lateral dimension of said second part across the crests of said lobes being less than said first diameter,
      said tubular portion of said sleeve being expanded outwardly between said flange and said third part for compressing said workpiece at said opening, whereby the fatigue life of said workpiece is increased by said compression thereof at said first and second corners and along said opening.

16. A device as recited in claim 15 in which said lobes extend into said third part of said tubular portion.

17. A device as recited in claim 16 in which said lobes taper in dimension in said third part of said tubular portion as they approach said first part.

18. A device as recited in claim 15 in which said lobes taper toward said outer end portion of said sleeve.

19. A device as recited in claim 18 in which said outer end portion tapers in thickness to the outer end of said sleeve.

20. A device as recited in claim 15 in which said third part is rounded and concave.

21. A device as recited in claim 15 in which said first part is substantially complementary to the wall of said opening in said bottom wall of said basket.

* * * * *